(12) United States Patent
Margalit et al.

(10) Patent No.: US 9,676,404 B2
(45) Date of Patent: Jun. 13, 2017

(54) METHOD AND SYSTEM FOR PREVENTING SHOPPING CART THEFT

(71) Applicant: NOMIL LTD., Bnei Brak (IL)

(72) Inventors: Yehuda Margalit, Bnei Brak (IL); Ruth Margalit, Bnei Brak (IL)

(73) Assignee: NOMIL LTD., Bnei Brak (IL)

( * ) Notice: Subject to any disclaimer, the term of this patent is extended or adjusted under 35 U.S.C. 154(b) by 318 days.

(21) Appl. No.: 14/374,128

(22) PCT Filed: Jan. 23, 2013

(86) PCT No.: PCT/IL2013/050062
§ 371 (c)(1),
(2) Date: Jul. 23, 2014

(87) PCT Pub. No.: WO2013/111131
PCT Pub. Date: Aug. 1, 2013

(65) Prior Publication Data
US 2015/0070170 A1    Mar. 12, 2015

Related U.S. Application Data

(60) Provisional application No. 61/589,542, filed on Jan. 23, 2012.

(51) Int. Cl.
*G08B 1/08* (2006.01)
*B62B 3/14* (2006.01)
(Continued)

(52) U.S. Cl.
CPC ............ *B62B 3/1404* (2013.01); *A47F 10/02* (2013.01); *A47F 10/04* (2013.01); *G07F 7/0681* (2013.01)

(58) Field of Classification Search
CPC . A47F 10/02; A47F 10/04; B62B 3/14; B62B 3/1404; B62B 3/1424;
(Continued)

(56) References Cited

U.S. PATENT DOCUMENTS 6,024,203 A * 2/2000 Amdahl ................. A47F 10/04
194/213
6,486,768 B1   11/2002 French et al.
(Continued)

FOREIGN PATENT DOCUMENTS

DE        19625525 A1    1/1998
EP         2261108 A2   12/2010

*Primary Examiner* — Van Trieu
(74) *Attorney, Agent, or Firm* — Browdy and Neimark, PLLC

(57) ABSTRACT

The present invention provides a system and method for preventing theft of mobile objects which are used by for temporary time period by anonymous users. The system is comprised of: at least one locking mechanism engaging a mobile object to a secure locking arrangement, wherein the locking mechanism can be unlocked by a remote communication device, an identifying tag attached to said mobile object including an identifying code, a controller network device including identification data of plurality of mobile objects, said controller device is enabled to send unlocking instruction to at least one locking mechanism and a mobile communication device enabled to send electronic message to said controller network device.

6 Claims, 16 Drawing Sheets

(51) Int. Cl.
*A47F 10/04* (2006.01)
*A47F 10/02* (2006.01)
*G07F 7/06* (2006.01)

(58) Field of Classification Search
CPC .............. B62B 5/0423; G08B 13/2434; G08B 13/2448; G08B 13/2482; G08G 1/20; G08G 1/207
See application file for complete search history.

(56) References Cited

U.S. PATENT DOCUMENTS

| | | |
|---|---|---|
| 8,046,160 B2 | 10/2011 | Carter et al. |
| 2005/0230472 A1* | 10/2005 | Chang ................... G06Q 20/343 235/383 |
| 2006/0244588 A1* | 11/2006 | Hannah ................... A47F 10/04 340/539.13 |
| 2012/0227103 A1* | 9/2012 | Itagaki .................... G06F 21/31 726/16 |
| 2013/0187755 A1* | 7/2013 | Rogers ................... G06Q 30/06 340/5.61 |

* cited by examiner

METHOD AND SYSTEM FOR PREVENTING SHOPPING CART THEFT

BACKGROUND

Technical Field

The present invention relates to the field of theft prevention and more specifically to shopping cart theft prevention.

Discussion of Related Art

The known is the art shopping cart management systems include RFID tag for identifying the shopping cart enabling to manage the inventory of shopping carts. The user's identity is achieved by reading their identity cards and enable to track users shopping activities.

BRIEF SUMMARY

The present invention provides a system for preventing theft of mobile objects which are used by for temporary time period by anonymous users. The system comprised of: at least one restriction mechanism for controlling the usage of the mobile object, wherein the restriction mechanism is controlled by a remote communication device, an identifying tag attached to said mobile object including an identifying code, a controller network device including identification data of plurality of mobile objects, said controller device is enabled to send unlocking instruction to at least one locking mechanism and a communication device for receiving identification information from at least one user. The a user is enabled to input identifying details at the controller network device, using the communication device, said identifying details including an identifier of the user, wherein upon receiving said update by the controller network device a release command is sent to the corresponding restricting mechanism for releasing at least one object.

According to some embodiments of the present invention the communication device is a personal mobile communication device of the user having electronic messaging application for sending the identifying details of the user to the controller network device.

According to some embodiments of the present invention the communication device is a personal mobile communication device of the user having dedicated smart phone application for sending the identifying details of the user to the controller network device.

The restriction mechanism is a secure locking arrangement enabling to restrict the movement of a mobile object using at least one locking mechanism, wherein the locking mechanism can be unlocked by a remote communication device.

According to some embodiments of the present invention the communication device is associated with secure locking arrangement and include an application for retrieving identification details from personal identification card of the user.

According to some embodiments of the present invention the restriction mechanism include tracking module attached to the mobile object and alarm module, wherein the tracking module verifies location of the mobile object within a restricted rental area zone and the alarm module is programmed to identify a alarm status, incase the mobile object is tracked outside predefined restricted rental area zone and no request for releasing the mobile object was received or the rental predefined time period has lapsed.

According to some embodiments of the present invention upon receiving update of a releasing request for a mobile object, an association of user's mobile device and the unique identification codes of the mobile objects is recorded and upon receiving a locking update from the central control module the association between the user mobile device and mobile objects is deleted According to some embodiments of the present invention in case the limited time period permission has expired and the not indication of locking update of the mobile object, the user's mobile phone number is updated in a "black list".

According to some embodiments of the present invention the update to the central object of user's request using his mobile communication device is achieved using one of the following: sending an electronic message such as SMS to a designated number with the ID number appearing on the shopping cart he has selected, entering a request to a designated website or a designated smart phone application, reading barcode of the mobile object which includes the identification of the mobile object and transmitting to the server or dialing a designated number with the ID code of the mobile object.

According to some embodiments of the present invention, once the releasing is received, the request is verified an update is sent to the central control module of unlock state including association data of the user's mobile phone number and a releasing instruction is sent to the local controller.

According to some embodiments of the present invention the locking arrangement includes a stand having holes locking elements which are arrange to hook locking elements which are attached to the mobile object.

According to some embodiments of the present invention the holes locking elements include a solenoid which lock plug connectors of the mobiles object.

According to some embodiments of the present invention the locking arrangement includes a stand having a rail, enabling to slide locking elements which are attached to the mobile object.

According to some embodiments of the present invention the locking arrangement includes at least two sensors and at least two stoppers and a plug of the mobile object locking element is conveyed through the at least two stoppers for preventing the user to release more than one cart at a time, wherein the sensors indicate when the plug pass through corresponding stoppers.

The present invention provides a method for preventing theft of mobile objects which are used by for temporary time period by anonymous users. The method comprising the steps of: restricting a mobile object movement with predefined rental area zone, wherein the restricting is controlled by a remote communication device, input identifying details at the controller network device, using the communication device, receiving identification information from at least one user using the communication device by a communication server, wherein said identifying details including identifier of the user and identification of the object as retrieved from an identifying tag attached to said mobile object code and upon receiving said update by the controller network device a releasing command is sent to the corresponding restricting mechanism for releasing at least one object.

According to some embodiments of the present invention the communication device is a personal mobile communication device of the user having electronic messaging application for sending the identifying details of the user to the controller network device.

According to some embodiments of the present invention the communication device is a personal mobile communication device of the user having dedicate smart phone application for reading and sending the identifying details of the user to the controller network device.

According to some embodiments of the present invention the restriction mechanism is a secure locking arrangement enabling to restrict the movement of a mobile object using at least one locking mechanism, wherein the locking mechanism can be unlocked by a remote communication device.

According to some embodiments of the present invention the communication device is associated with the secure locking arrangement and include an application for retrieving identification details from personal identification card of the user.

According to some embodiments of the present invention the restriction mechanism include tracking module attached to the mobile object and alarm module, wherein the tracking module verifies location of the mobile object within a restricted rental area zone and the alarm module is programmed to identify a alarm status, incase the mobile object is tracked outside predefined restricted rental area zone and no request for releasing the mobile object was received or the rental predefined time period has lapsed.

According to some embodiments of the present invention the method further comprising the steps of: upon identifying a alarm status activates one of the following action: generating an alarm signal or disabling the movement of the mobile object.

According to some embodiments of the present invention further comprising the step of: upon receiving update of a releasing request for a mobile object, an association of user's mobile device and the unique identification codes of the mobile objects is recorded and upon receiving a locking update from the central control module the association between the user mobile device and mobile objects is deleted According to some embodiments of the present invention in case the limited time period permission has expired and the not indication of locking update of the mobile object, the user's mobile phone number is updated in a "black list".

According to some embodiments of the present invention the update to the central object of user's request using his mobile communication device is achieved using one of the following: sending an electronic message such as SMS to a designated number with the ID number appearing on the shopping cart he has selected, entering a request to a designated website or a designated smart phone application, reading barcode of the mobile object which includes the identification of the mobile object and transmitting to the server or dialing a designated number with the ID code of the mobile object.

According to some embodiments of the present invention once the releasing is received, the request is verified an update is sent to the central control module of unlock state including association data of the user's mobile phone number and a releasing instruction is sent to the local controller.

The present invention provides a system for preventing theft of mobile objects which are used by for temporary time period by anonymous users. The system comprised of: At least one locking mechanism engaging a mobile object to a secure locking arrangement, wherein the locking mechanism can be unlocked by a remote communication device, an identifying tag attached to said mobile object including an identifying code, a controller network device including identification data of plurality of mobile objects, said controller device is enabled to send unlocking instruction to at least one locking mechanism, a mobile communication device enabled to send electronic message to said controller network device. The user is enabled to input identifying details at the controller network device, using his mobile communication device, said identifying details including identifier of the user mobile communication device code and identification code of a specific mobile device, wherein receiving said update by the controller network device an unlocking command is sent to the corresponding locking mechanism for releasing at least one mobile object.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
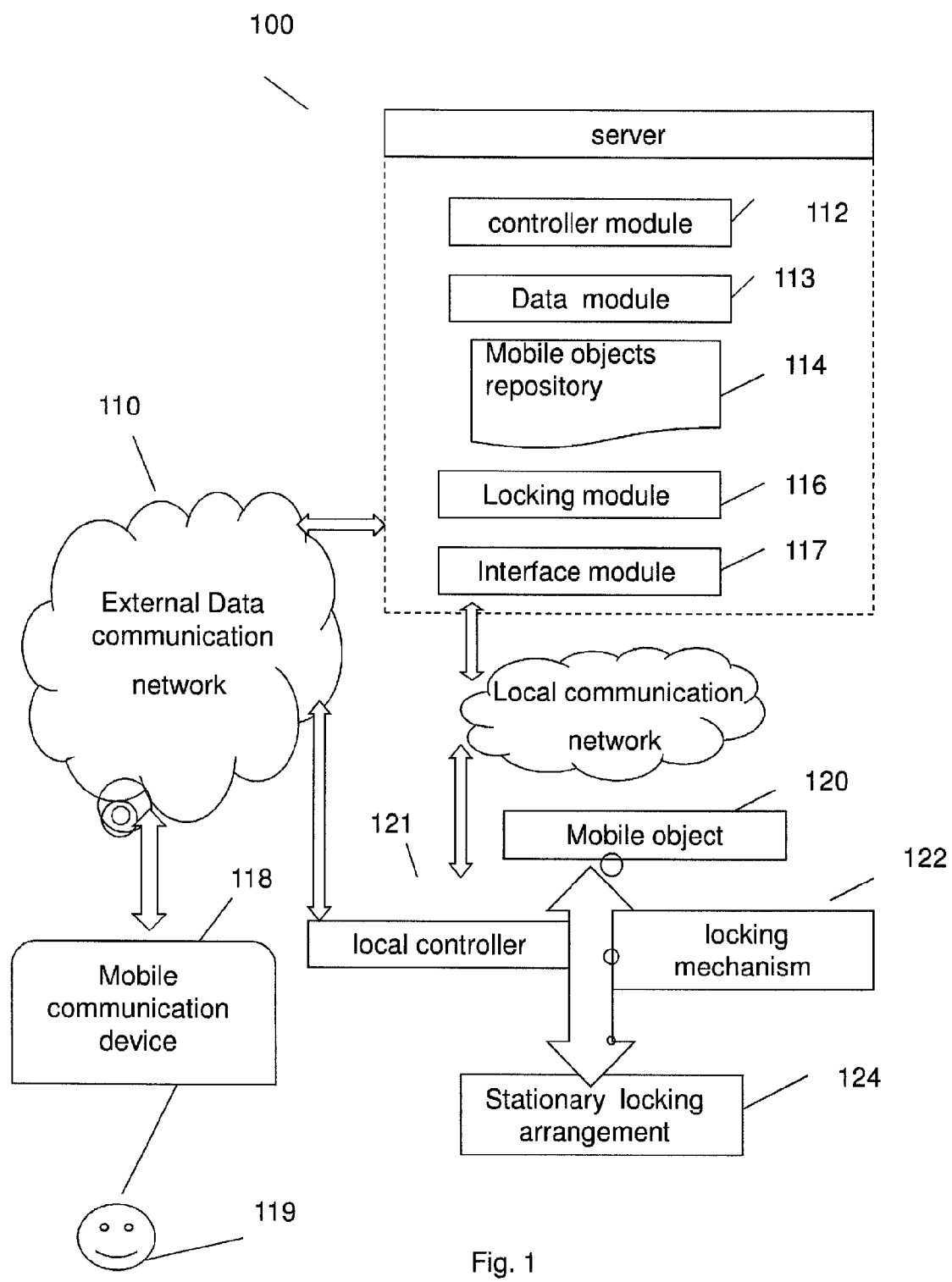
FIG. 1 is block diagram illustrating the components of the theft prevention system according to some embodiments of the invention.

Before explaining at least one embodiment of the invention in details, it is to be understood that the invention is not limited in its application to the details of construction and the arrangement of the components set forth in the following description or illustrated in the drawings. The invention is applicable to other embodiments and/or may be practiced or carried out in various ways. Also, it is to be understood that the phraseology and terminology employed herein is for the purpose of description and should not be regarded as limiting.

The present invention discloses a method and system for preventing theft of mobile devices to be used for temporally time period. The mobile devices such as a shopping cart are restricted by being locked to a stationary secure arrangement located at a commercial area or restricted movement within predefined area. Each shopping cart includes a Tag (electronic of physical) which contains an identifying code of the shopping cart. For releasing the shopping cart, the user is required to update an identifying code of the shopping cart to a central communication device using his mobile phone or dedicated communication device associated to stationary secure arrangement.

The update includes the identifying unique code of the shopping cart and the user's mobile phone number. The central communication devices records the association between the user mobile number and the unique identifying code of the shopping cart and transmits an instruction to release the shopping cart. When returning the shopping cart to the secure locking arrangement, the cart is automatically locked and a message is sent to the central communication device to update of locking status. In case the cart is not returned with in predefined time period, the system sends an alert/warning message to the user mobile device to remind him, optionally if not returning the cart after predefined time of period or the user phone number is updated in the a black list.

FIG. 1 illustrates the main components of the theft prevention system according to some embodiments of the present invention. The system comprises a server 100 for managing and controlling the usage of the plurality of mobile objects such as shopping cart, enabling anonymous users a limited usage for predefined time period of the mobile object optionally within a predefined area. The server includes a data module 113 for updating the mobile objects repository 114, a controller module 112 for monitoring the usage of the mobile objects, a locking module 116 for controlling a locking mechanism of 122 and interface module 117 for communication with the user's mobile devices 118 and the local controller 121. Each mobile object 120 is attached by locking mechanism 122 to a stationary secure locking arrangement 124. The locking mechanism is electronically controlled by the local controller device 121. Once a mobile object is returned by the user and locked to the stationary locking device, the local controller 121 reports the controller server. The local controller 121 and server 100 can communicate through communication data network 110 such as the Internet or through local network in case the server is positioned at the commercial area. The user 119 use his personal mobile 118 device for releasing the mobile object using electronic messaging device such as SMS or using dedicated application on a smart phone, in both options the user may read from the tag of the mobile device or enter the identifying ID of the tag, such as scanning barcode and send request for releasing the mobile object.

Figure 1A:
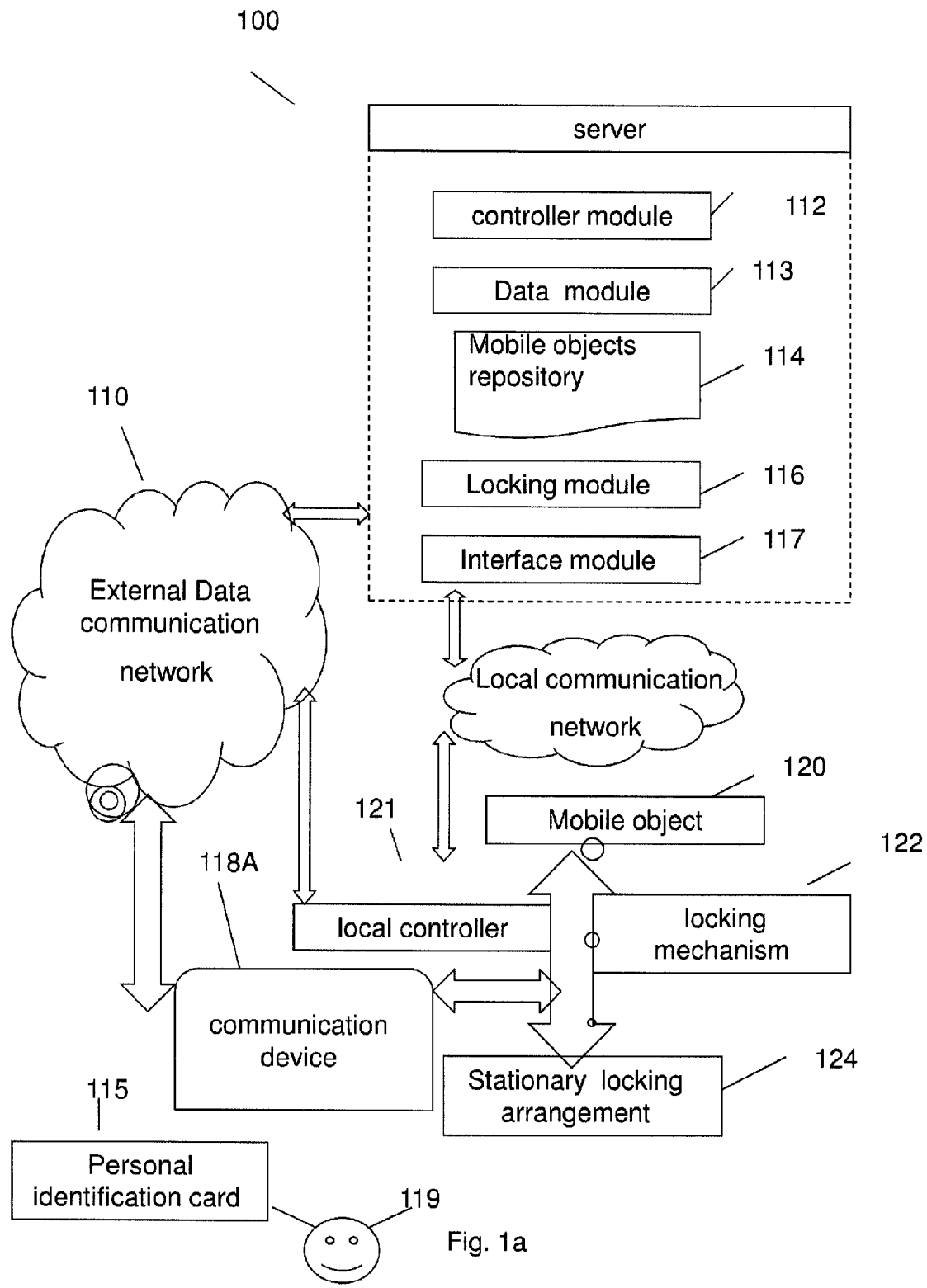
FIG. 1A is block diagram illustrating the theft prevention system according to some embodiments of the invention.

FIG. 1a illustrates the main components of the theft prevention system according to other embodiments of the present invention. The system comprises a server 100 for managing and controlling the usage of the plurality of mobile objects such as shopping cart, enabling anonymous users a limited usage for predefined time period of the mobile object optionally within a predefined area. The server includes a data module 113 for updating the mobile objects repository 114, a controller module 112 for monitoring the usage of the mobile objects, a locking module 116 for controlling a locking mechanism of 122 and interface module 117 for communication with the local communication device 118A and the local controller 121. Each mobile object 120 is attached by locking mechanism 122 to a stationary secure locking arrangement 124. The locking mechanism is electronically controlled by the local controller device 121. Once a mobile object is returned by the user and locked to the stationary locking device, the local controller 121 reports the controller server.

The local controller 121 and server 100 can communicate through communication data network 110 such as the Internet or through local network in case the server is positioned at the commercial area.

The local communication device 118A can be integrated part of the local controller or a separate part which is connected with the local controller, this local communication device communicates with an ID card 120 of the user 119. This local communication may be implemented using barcode reading, blue tooth protocol or RF communication or any wireless communication link for receiving the ID of the user. According to this embodiment the ID of the mobile object may be derived from the release order of the mobile objects which can be determined in the controller server. Optionally the locking mechanism may include detection module for reading the ID code of the mobile object.

Figure 2:
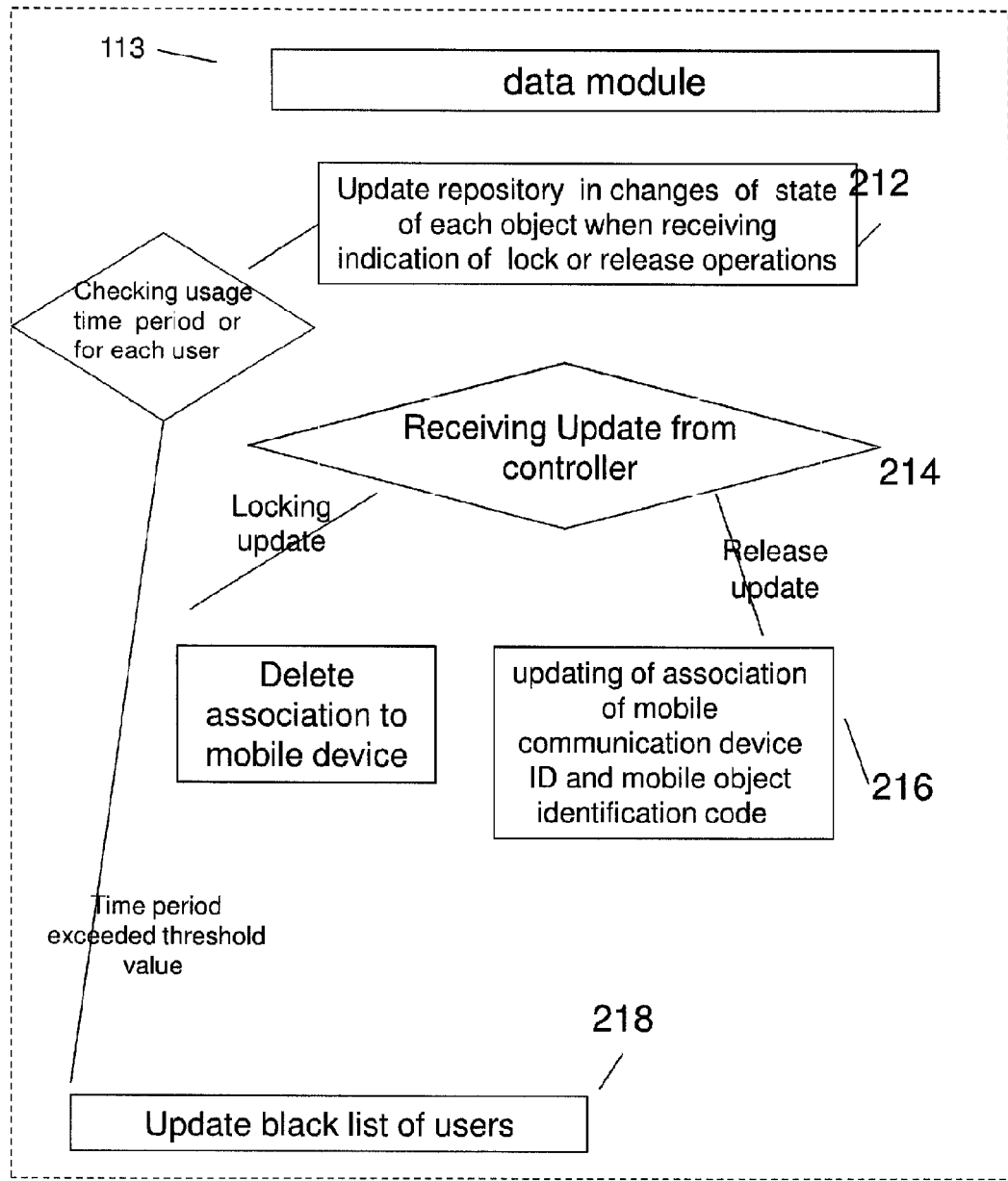
FIG. 2 illustration the flow chart of the data module according to some embodiments of the invention.

FIG. 2 illustrates the process of the data module according to some embodiments of the present invention. When adding new mobile object to the system the system is updated with the data of the new object which is recorded in the repository 114. The mobile objects status is changed when receiving an update from the controller module of releasing an object or when locking a mobile object (step 212). When receiving update of a releasing request for a mobile object, an association of user's mobile device and the unique identification codes of the mobile objects is recorded (step 214). Upon receiving a locking update from the central control module the association between the user mobile device and mobile objects is deleted (step 216). In case the limited time period permission has expired and the user didn't return the mobile object, the user's mobile phone number is updated in a "black list". Optionally users appearing in this list will not be able to receive permission to use mobile objects in the future.

Figure 3:
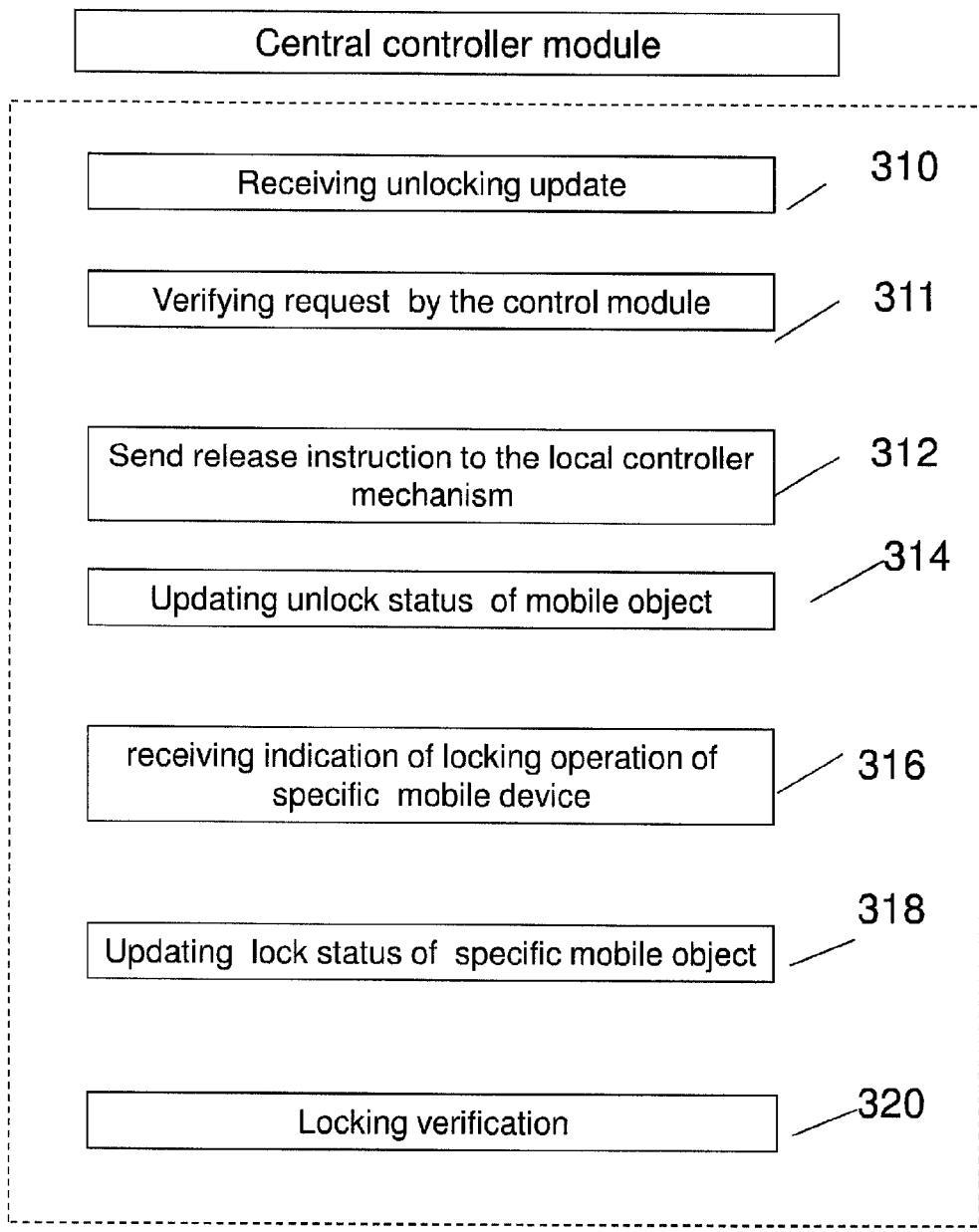
FIG. 3 illustration the flow chart of the central control module according to some embodiments of the invention.

FIG. 3 illustrates the process of the central control module according to some embodiments of the present invention. The central control module receives updates of mobile object locking status from interface module and the local controller. Once receiving update of user's request of unlocking a mobile object (step 310), the control module verifies user request (step 311) before a release instruction is sent to the local controller for releasing the selected shopping cart (step 312) and an update of the mobile object status message is sent to the data module (step 314) including association data of the user's mobile phone number. When the users returns the shopping cart, the cart is locked to secure locking arrangement, upon locking an indication is received (step 316). An update locked status is sent to the data module (step 318).

Figure 4:
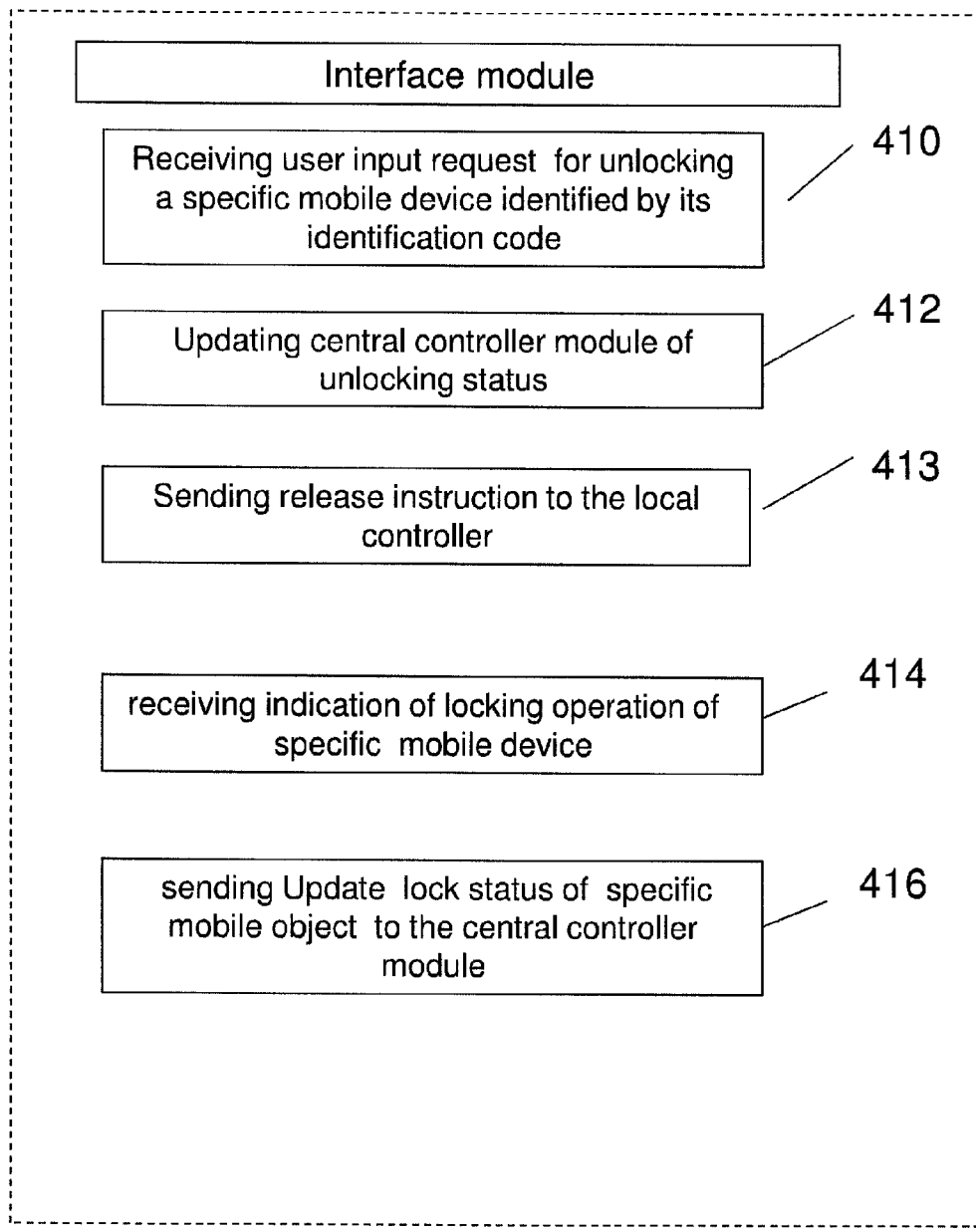
FIG. 4 illustration the flow chart of the interface module according to some embodiments of the invention.

FIG. 4 illustrates the process of the interface module according to some embodiments of the present invention. The locking module receives updates of mobile object locking status from user's mobile phone and from the local controller. When the user requests to use a mobile object such as a shopping cart, he can update the central control module 112 in his request using his mobile communication device using one of the following options:

sending an electronic message such as SMS to a designated number with the ID number appearing on the shopping cart he has selected;

entering a request to a designated website or a designated smart phone application;

reading barcode (optimally 2D bar code) of the mobile object (which includes the identification of the mobile object) and transmitting to the server; dialing a designated number with the ID code of the mobile object;

Once the message is received by the interface module, and the request is verified (step 410) an update is sent to the central control module 112 of unlock state (step 412) including association data of the user's mobile phone number and a releasing instruction is sent to the local controller 121 (step 413). When the users returns the shopping cart, the cart is locked to secure locking arrangement, upon locking an indication is received from the local control module (step 414). The interface module updates of the lock status to the central control module (step 416). Optionally according to the embodiment illustrated in FIG. 1*a*, only the user ID is received from the communication 118 and the mobile object device is received from the server.

Figure 5:
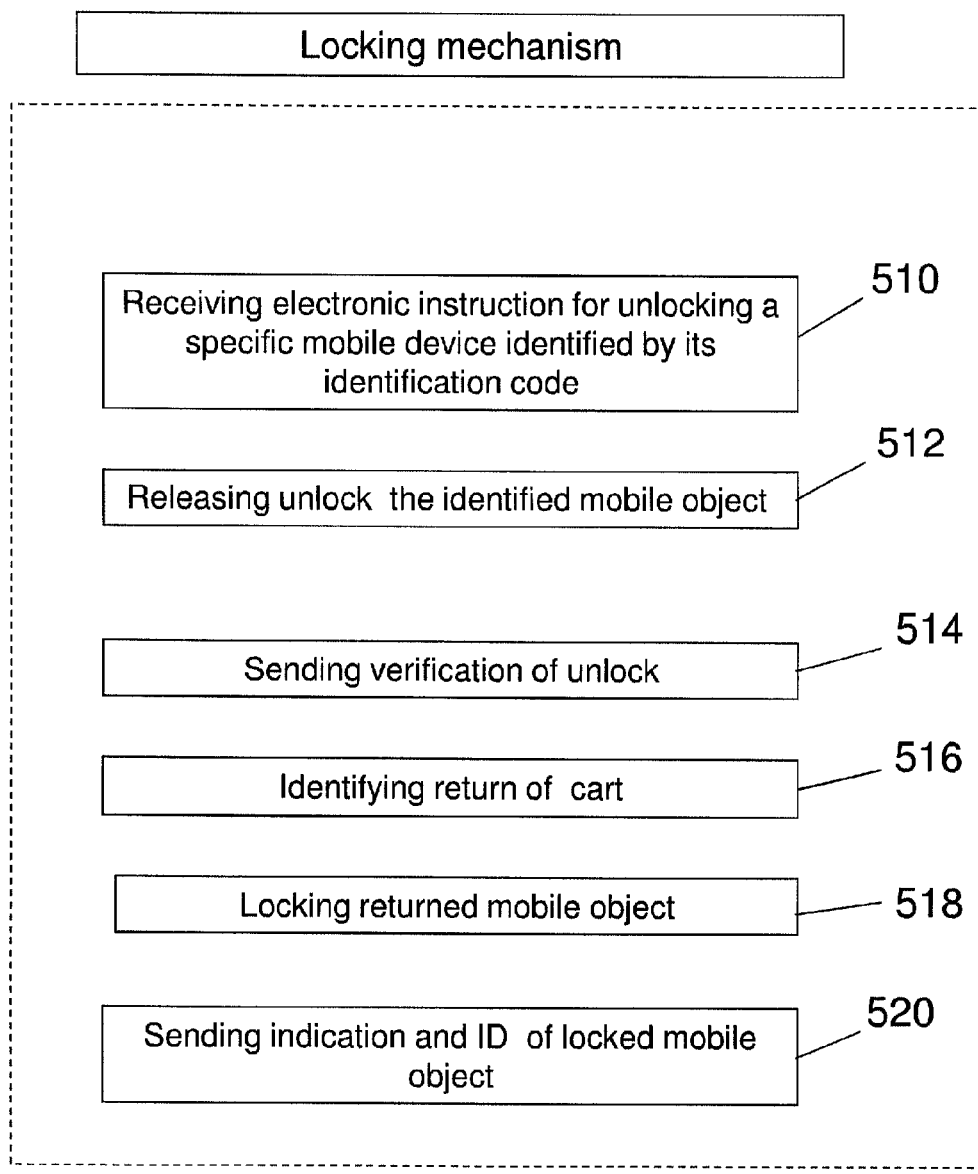
FIG. 5 is an illustration the flow chart of the locking mechanism according to some embodiments of the invention.

FIG. 5 illustrates the process of the locking mechanism according to some embodiments of the present invention. The locking mechanism enables to lock at least one mobile object to the secure locking arrangement, where the releasing of the mobile object is controlled electronically by the local controller device 121. The releasing operation is activated (step 520) once receiving an instruction from the local controller device (step 510), which identifies the object to be released by it's identification code. Optionally the instruction doesn't include the identification code of the mobile object and first in line object is released. Once the object is release a verification message is sent to the local controller (step 514). When the users return the mobile objects to the secure locking arrangement, the returned mobile objects is identified (step 516) the mobile object is locked (step 518) and an electronic indication is automatically sent to the local control module (step 520).

Figure 6:
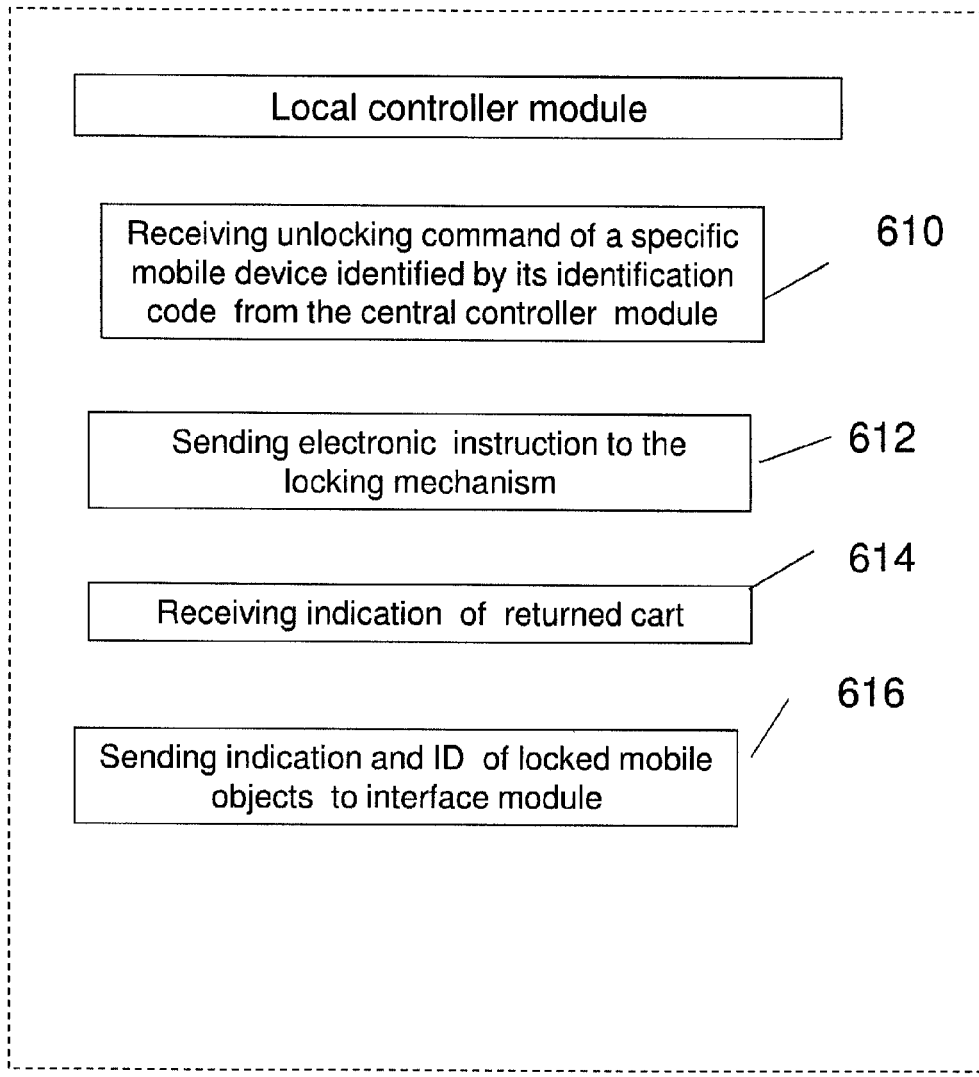
FIG. 6 is an illustration the flow chart of the local controller module according to some embodiments of the invention.

FIG. 6 illustrates the process of the local control module according to some embodiments of the present invention. The module receives unlocking command of a specific mobile device identified by its identification code from the central controller module (step 610) and sends an electronic instruction to the locking mechanism for releasing the identified mobile object. Upon receiving indication of returned locked mobile object and indication message is sent to the interface module including the ID of the locked mobile object.

Figure 7:
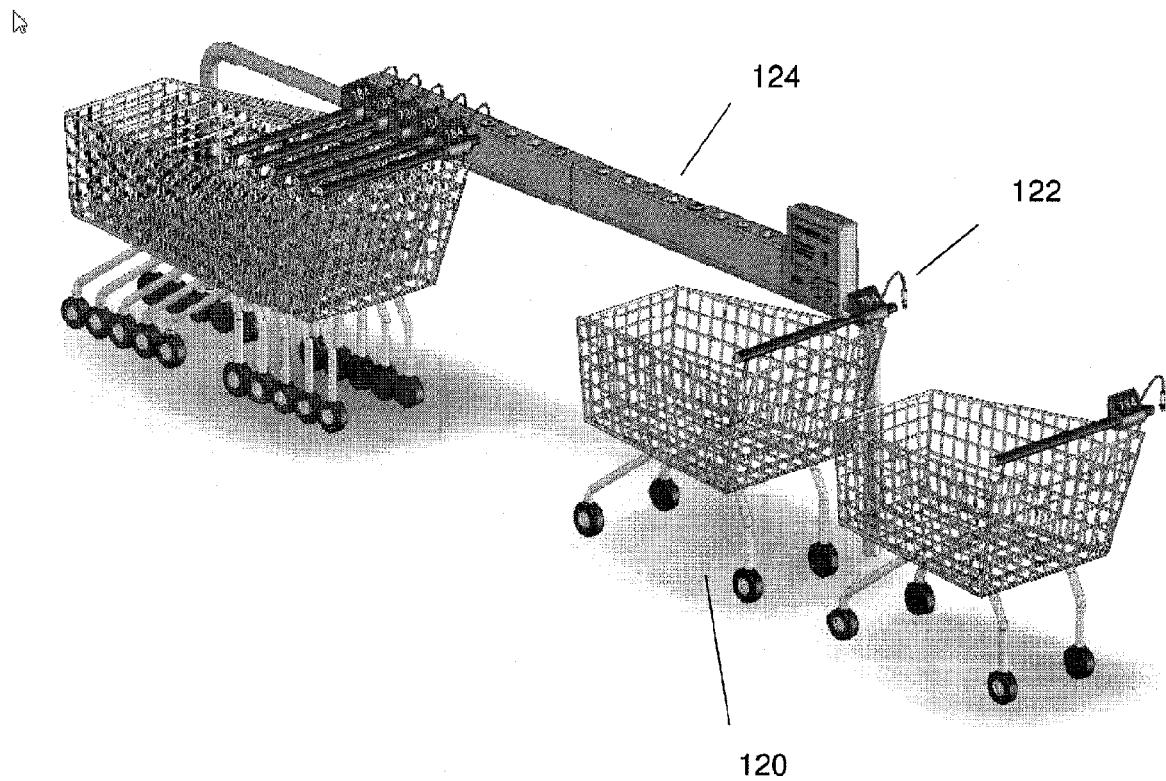
FIG. 7 is an illustration a first locking mechanism according to some embodiments of the invention.

FIG. 7 is a schematic illustration of a first secure locking arrangement according to some embodiments of the present invention. Plurality of shopping carts 120 are connected via locking mechanism 122 to secure locking arrangement 124. The secure locking arrangement includes a stand having holes locking elements 128 (see FIG. 9) which are arrange to hook the locking elements which are attached to the shopping cart. Such arrangement allows locking plurality of carts be stacked together occupying minimum space.

Figure 8:
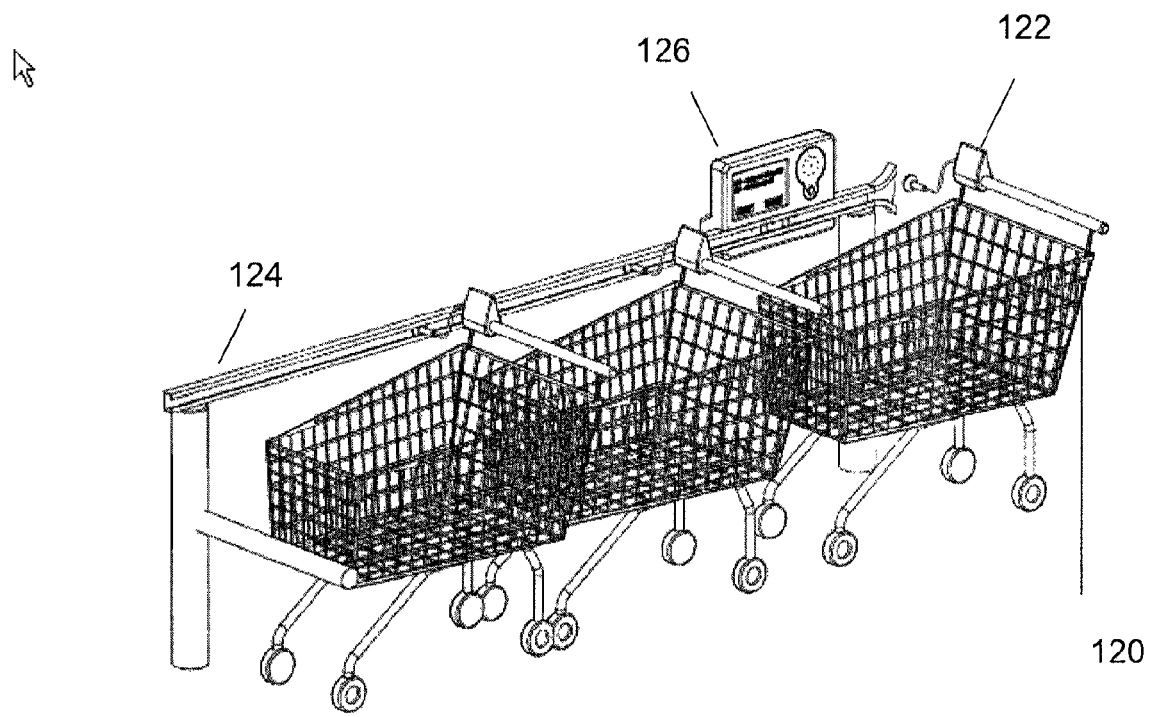
FIG. 8 is an illustration a second locking mechanism according to some embodiments of the invention.

FIG. 8 is a schematic illustration of a second secure locking arrangement according to some embodiments of the present invention. Plurality of shopping carts 120 are connected via locking mechanism 122 to secure locking arrangement 124. The secure locking arrangement includes a stand having a rail, enabling to slide locking elements which are attached to the shopping carts. Such arrangement allows locking plurality of carts, stacked together, occupying minimum space.

Figure 9:
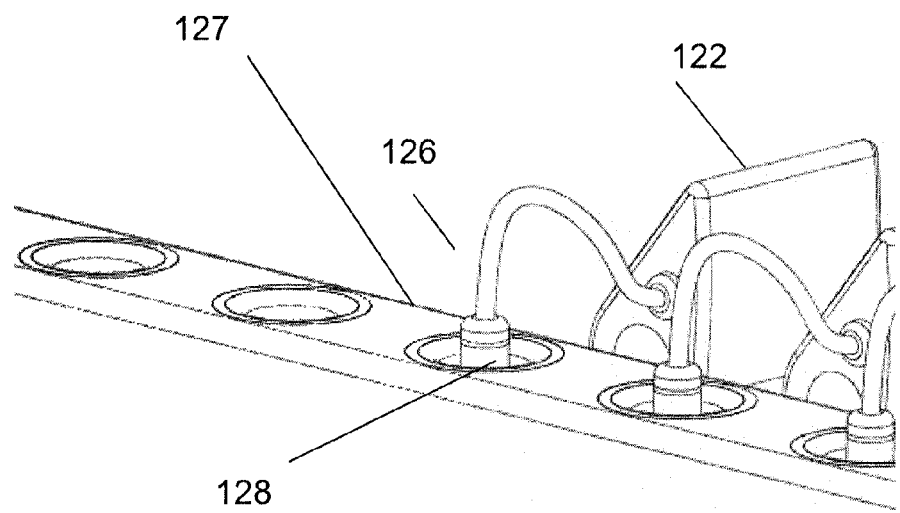
FIG. 9 is an illustration a first locking mechanism according to some embodiments of the invention.

FIG. 9 is a schematic detailed illustration of a first secure locking arrangement according to some embodiments of the present invention. This figure illustrates an enlarged view of the a locking element in the lock position, a plug element 126 is inserted within a cylindrical cavity 128 located at the locking arrangement stand. In a lock state is activated a led 127 on the stand indicating of the lock state.

Figure 10:
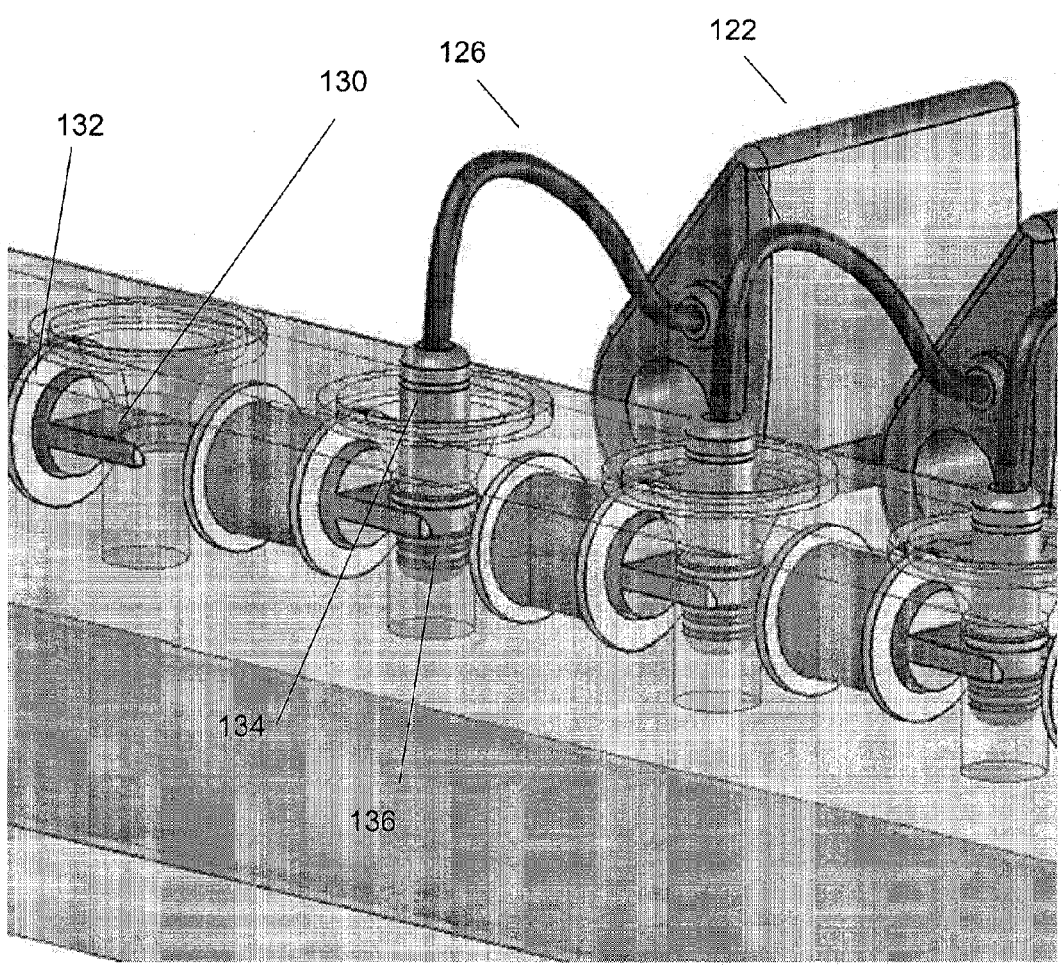
FIG. 10 is an illustration a first locking mechanism according to some embodiments of the invention.

FIG. 10 is a schematic detailed illustration of a first secure locking arrangement according to some embodiments of the present invention. This figure illustrate an enlarge view of the a locking element in the lock position, further showing the inner parts within locking arrangement, including a solenoid 132 having solenoid core 130. At a locking operation the solenoid and the it's core is activated locking the plug connectors 146 which secure the plug 134 in it's position.

Figure 11:
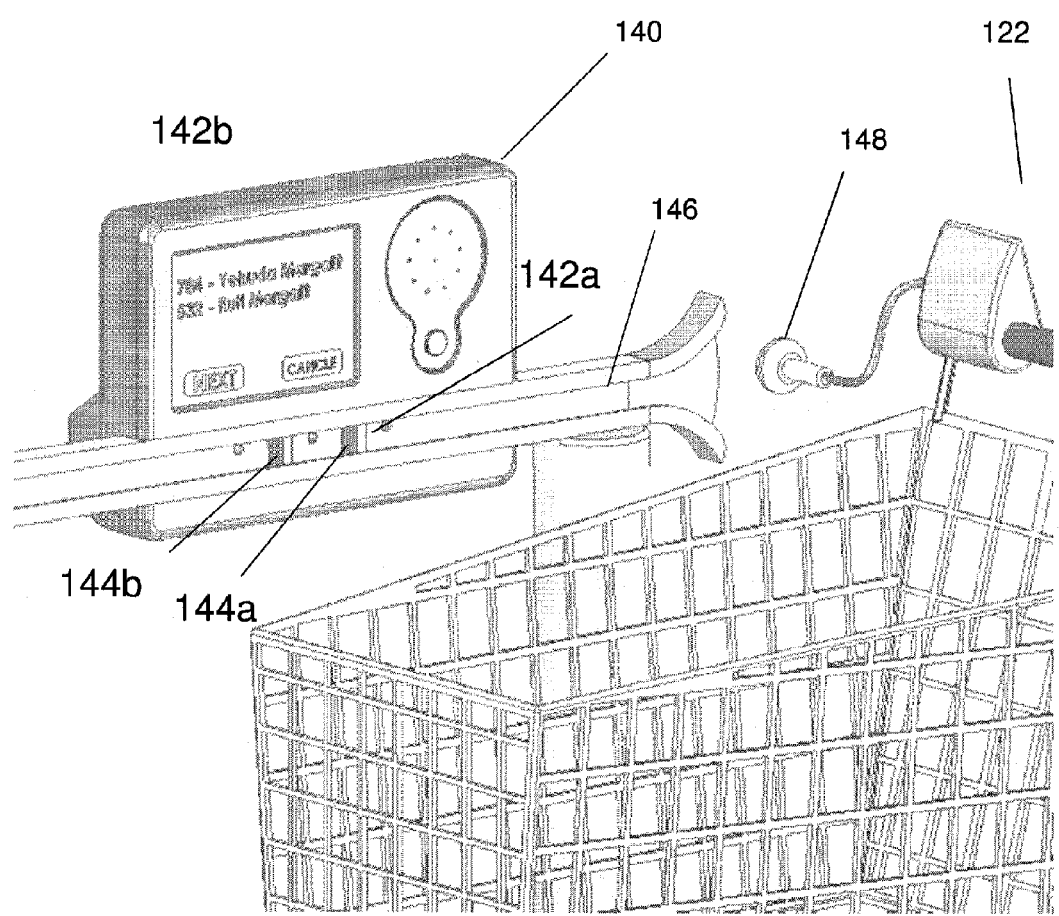
FIG. 11 is an illustration a second locking mechanism according to some embodiments of the invention.
Figure 12:
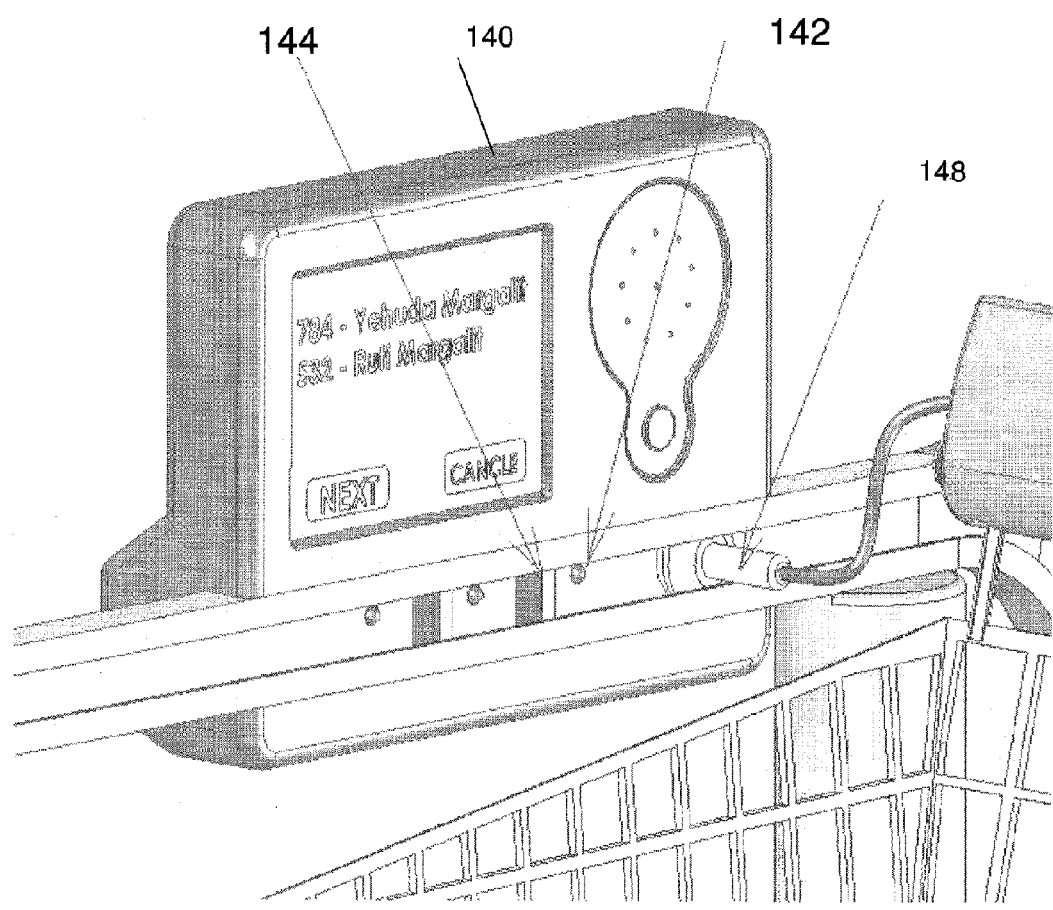
FIG. 12 is an illustration a second locking mechanism according to some embodiments of the invention.

FIGS. 11 and 12 are schematic detailed illustration of a second secure locking arrangement according to some embodiments of the present invention.

FIG. 11 illustrate locking second secure locking arrangement and cart in an unengaged position. This locking arrangement integrates rail 146 including three sensors and two stoppers. The plug 148 connected to the cart is design to slide within the rail 146, when sliding the plug locking element in and out along the rail, the plug 148 is conveyed through two stoppers 144*a* and 144B for preventing the user to release more than one cart at a time. The sensors 142*a* and a 142*b* indicate when the plug pas through corresponding stoppers 144*a* and 144 *b*.

FIG. 11 illustrate locking second secure locking arrangement and cart in an engaged position where the plug 148 slides along the rail 146.

Figure 13:
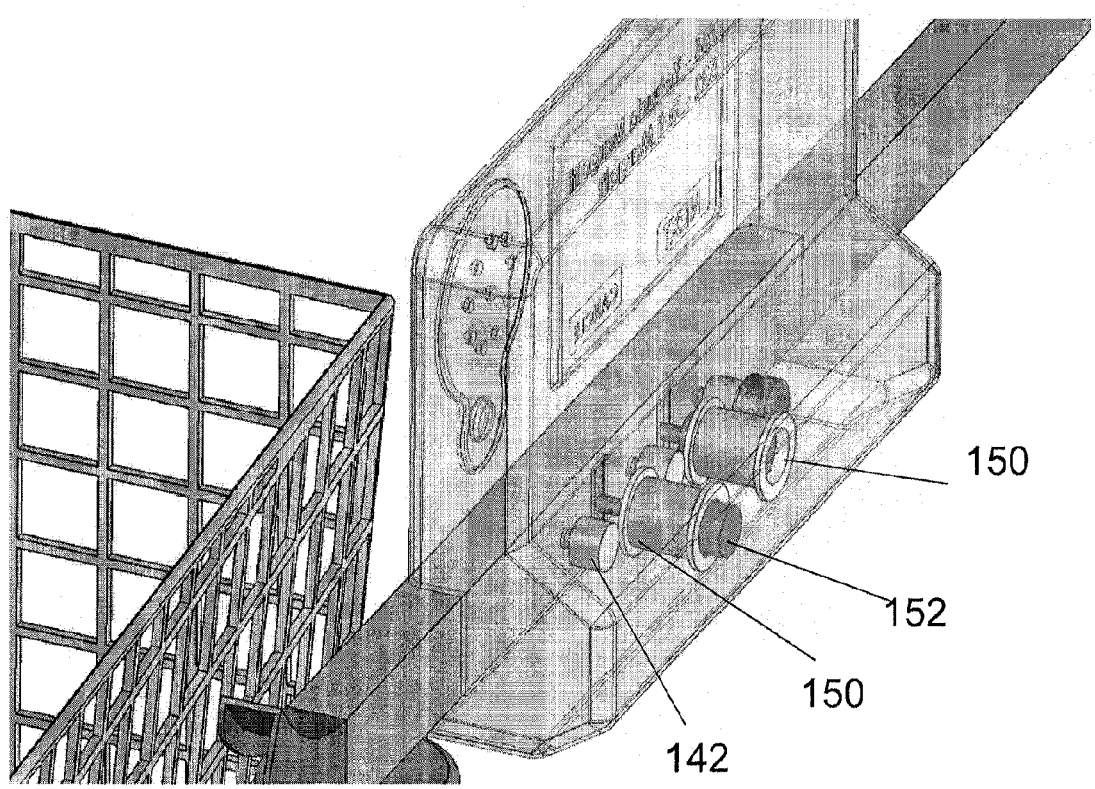
FIG. 13 is an illustration a second locking mechanism according to some embodiments of the invention.
Figure 14:
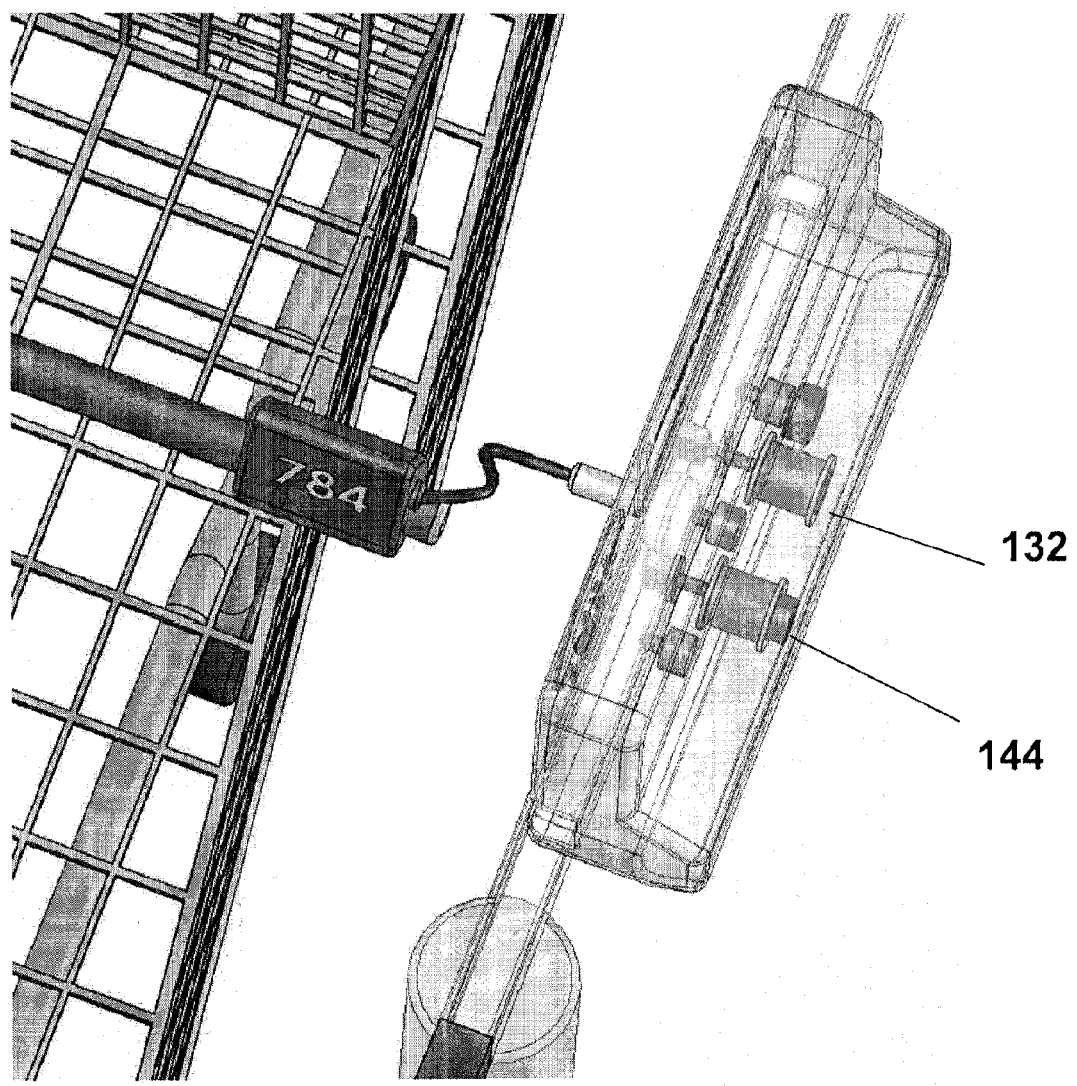
FIG. 14 is an illustration a second locking mechanism according to some embodiments of the invention.

FIGS. 13 and 14 are schematic detailed illustration of a second secure locking arrangement according to some embodiments of the present invention. These figures illustrates the detailed construction of the sensors the two stoppers, each stopper 144 includes a solenoid 155 which encapsulates the stopper button 152, when activating/deactivating in solenoid, the stopper button moves is in and out respectfully for blocking/unblocking the plug movement.

It is to be understood that the phraseology and terminology employed herein is not to be construed as limiting and are for descriptive purpose only.

Figure 15:
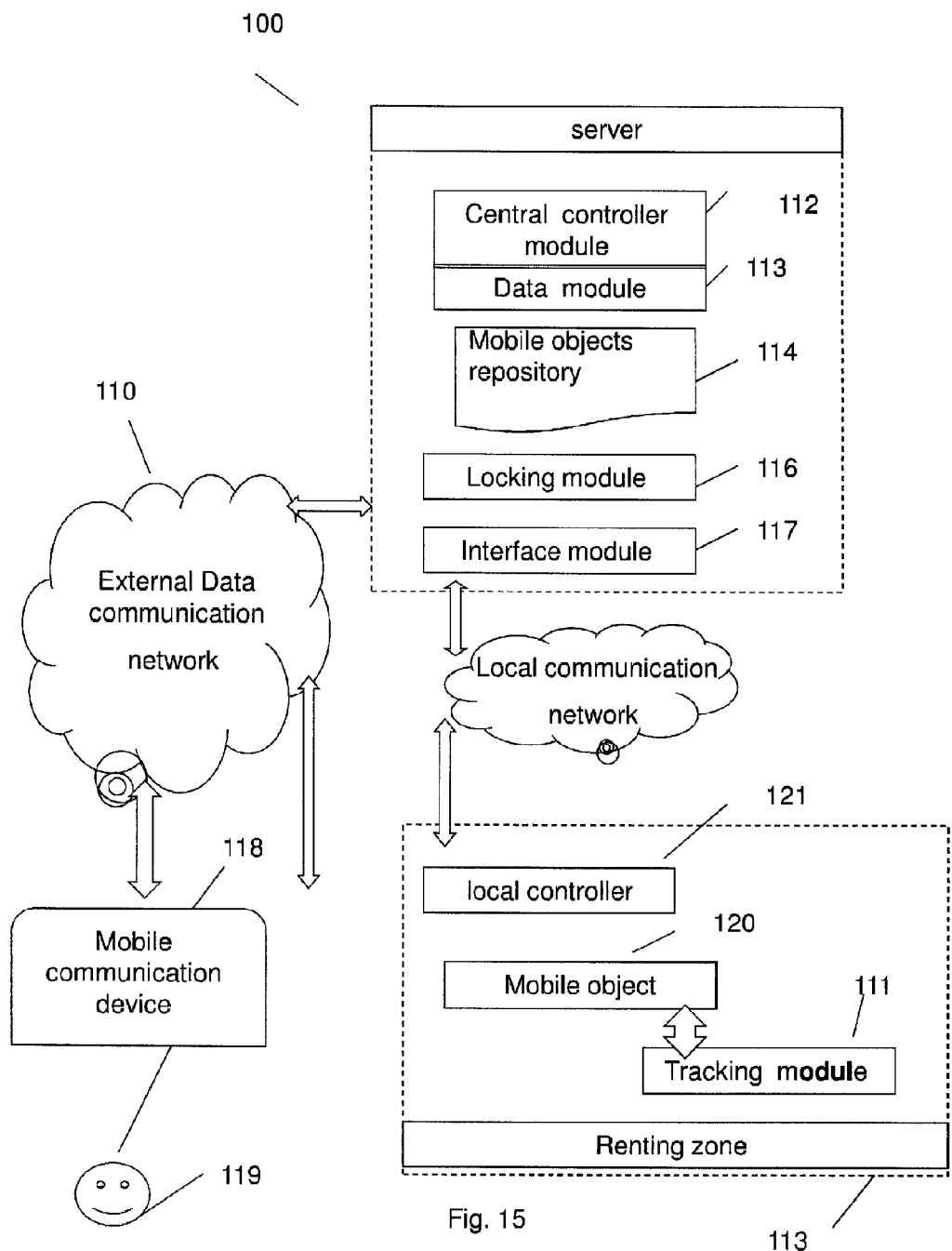
FIG. 15 is block diagram illustrating the theft prevention system according to some embodiments of the invention.

FIG. 15 is a block diagram illustrating the theft prevention system according to some embodiments of the invention.

The system comprises a server 100 for managing and controlling the usage of the plurality of mobile objects such as shopping cart, enabling anonymous users a limited usage for predefined time period of the mobile object optionally within a predefined area. The server includes a data module 113 for updating the mobile objects repository 114, a controller module 112 for monitoring the usage of the mobile objects, a restriction mechanism such as a tracking module 111 for controlling and restricting the usage of the mobile objects within the restricted rental zone and interface module 117 for communication with the user's mobile devices 118 and the local controller 121. Each mobile object 120 includes a tracking module 111 enabling to communicate with local controller 121. Once a mobile object is returned by the user to the restricted rental zone, the local controller 121 reports the controller device. The local controller 121 and server 100 can communicate through communication data network 110 such as the Internet or through local network in case the server is positioned at the commercial area. The user 119 can use his personal mobile 118 device for enabling the usage of the mobile object using electronic messaging device such as SMS or using dedicated application on a smart phone, in both option the user may read from the tag of the mobile object or enter the identifying ID of the tag and send request for using the mobile object. In case the user don't request permission to use the mobile object and the mobile object was tracked out of the restricted rental area zone, an alarm status is activated, optionally generating warning sound or the mobile object movement is disabled.

In case the user doesn't return the mobile object to the restricted rental zone the within predefined time period, the alarm status is activated.

According to some embodiments of the present invention the system may further comprise a at least one checkup module located at a selling point of a store which rent shopping carts to be used within it's facilities. The check module include a communication module for reading ID of the mobile object located near by the selling point for verifying that the user which its mobile phone is associated with the shopping paid before leaving the store. In case the users returns the mobile object and no verification of payment was received from the checkup module the user may be marked for inspection. Such check module may enable to prevent thefts.

The principles and uses of the teachings of the present invention may be better understood with reference to the accompanying description, figures and examples. It is to be understood that the details set forth herein do not construe a limitation to an application of the invention.

Furthermore, it is to be understood that the invention can be carried out or practiced in various ways and that the invention can be implemented in embodiments other than the ones outlined in the description above. It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element. It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalent

What is claimed is:

1. A system for mobile object management, said system comprised of:
    a secure locking arrangement for controlling the usage of a mobile object;
    an identifying tag attached to said mobile object including an identifying code; and
    a server configured to implement a process including
        recording the identifying code of the mobile object,
        receiving, from a mobile communication device of a user, a request message requesting use of the mobile object, including the identifying code and a number of the mobile communication device,
        testing to determine if the received number of the mobile communication device is in a blacklist designating users having unreturned mobile objects and issuing a denial message if the received number is found in the blacklist,
        responsive to not detecting a denial message, sending a release command including the identifying code to the secure locking arrangement, causing the release of the mobile object,
        associating the identifying code of the mobile object with the number of the mobile communication device, and
        responsive to not receiving during a pre-defined time period a locked status from the secure locking arrangement indicating return of the mobile object identified by the identifying code, sending an alert to the mobile communication device identified by the number of the mobile communication device.

2. The system of claim 1, further comprising the mobile communication device, wherein the mobile communication device is configured with at least one of an electronic messaging service and a dedicated smart phone application for sending the request message.

3. The system of claim 1, wherein the secure locking arrangement comprises a stand having a rail, a solenoid, at least two stoppers for preventing release of more than one mobile object at a time, and two sensors configured to indicate when a plug passes through the stoppers.

4. A method for mobile object management, said method comprising the steps of:
    securing a mobile object to a secure locking arrangement;
    attaching an identification tag to the mobile object including an identifying code; and
    operating a server configured to implement a process including
    recording the identifying code of the mobile object,
    receiving from a mobile communication device of a user a request message including the identifying code and a number of the mobile communication device, testing to deny permission, due to the number of the mobile communication device being in a blacklist designating users having unreturned mobile objects, responsive to no denial of permission, sending a release command to the secure locking arrangement, thereby unlocking the mobile object, associating the identifying code of the mobile object with the number of the mobile communication device, responsive to not receiving during a pre-defined time period a locked status from the secure locking arrangement indicating return of the mobile object identified by the identifying code, sending an alert to the mobile communication device identified by the number of the mobile communication device.

5. The method of claim 4, wherein the server is further configured responsive to not receiving the locked status to add the number of the mobile communication device to the blacklist.

6. The method of claim 4, further comprising configuring the mobile communication device with at least one of an electronic messaging service and a dedicated smart phone application for sending the request message.

* * * * *